United States Patent [19]

Meverden et al.

[11] Patent Number: 5,036,147
[45] Date of Patent: Jul. 30, 1991

[54] PROPYLENE POLYMERIZATION METHOD

[75] Inventors: Craig C. Meverden, Mason, Ohio; Thomas J. Pullukat, Hoffman Estates, Ill.

[73] Assignee: Quantum Chemical Corporation, Cincinnati, Ohio

[21] Appl. No.: 580,764

[22] Filed: Sep. 11, 1990

Related U.S. Application Data

[62] Division of Ser. No. 374,660, Jun. 30, 1989, Pat. No. 4,968,653.

[51] Int. Cl.$^5$ .............................................. C08F 4/654
[52] U.S. Cl. .................................... 526/119; 526/128; 526/129; 526/351; 502/116
[58] Field of Search ........................ 526/119, 128, 129

[56] References Cited

U.S. PATENT DOCUMENTS

| | | | |
|---|---|---|---|
| 4,115,319 | 9/1978 | Scata et al. | 252/429 B |
| 4,301,029 | 11/1981 | Caunt et al. | 252/429 B |
| 4,329,252 | 5/1982 | Gavens et al. | 252/429 B |
| 4,383,119 | 5/1983 | Pullukat et al. | 556/412 |
| 4,499,198 | 2/1985 | Pullukat et al. | 502/104 |
| 4,530,912 | 7/1985 | Pullukat et al. | 502/104 |
| 4,530,913 | 7/1985 | Pullukat et al. | 502/104 |
| 4,544,646 | 10/1985 | Pullukat et al. | 502/109 |

*Primary Examiner*—Patrick P. Garvin
*Attorney, Agent, or Firm*—Marshall, O'Toole, Gerstein, Murray & Bicknell

[57] ABSTRACT

A solid catalyst component and catalyst system, and method for the homopolymerization of propylene or copolymerization of a major amount of propylene with one or more other 1-olefins are disclosed. The solid catalyst component is used in combination with a complex of an alkyl aluminum cocatalyst compound and an electron donor stereoregulating agent. The solid catalyst component is prepared by reacting a silica-containing support material with a magnesium silylamide compound, an electron donor stereoregulating agent, and a halogenated tetravalent titanium compound.

32 Claims, No Drawings

PROPYLENE POLYMERIZATION METHOD

CROSS-REFERENCE TO RELATED APPLICATION

This is a division of copending, commonly assigned application Ser. No. 07/374,660 filed June 30, 1989, and now Pat. No. 4,968,653 issued Nov. 6, 1990.

BACKGROUND OF THE INVENTION

1. Field of the Invention

The invention relates to catalyst components and systems for the polymerization of olefins, methods of preparing the same, and methods of polymerizing 1-olefins with the catalyst systems.

2. Description of Related Technology

Ziegler-Natta catalyst components for olefin polymerization having transition metal compounds deposited on carriers are well known. These catalysts are distinguishable from earlier, unsupported Ziegler-Natta catalysts in that they often have improved activity per unit weight of catalyst and/or lead to decreased amounts of active catalyst residues persisting in the polymer product.

Depositing transition metal compounds onto the surface of an inert particulate support material has the dual purpose of creating a catalyst component which efficiently utilizes the transition metal, thus eliminating the necessity for costly removal of catalyst residues from product polymer, and of producing a catalyst component which is uniform in particle size and shape. The morphology of the catalyst particle is replicated in the polymer particle during polymerization. Thus it is important for catalyst performance, particularly in gas-phase polymerization processes, that the catalyst be as uniform as possible in size and shape.

Many prior olefin polymerization catalysts utilized metal oxides such as silica or alumina as a support material for the deposition of transition metal compounds. The vast majority of these are suitable only for polymerization of ethylene or copolymerization of ethylene with other olefins. Very few have been intended for polymerization of higher olefins such as propylene.

A catalyst component for propylene polymerization in which a porous inorganic oxide material, such as silica, is treated with a dihydrocarbylmagnesium compound and then with a halogenating agent, a Lewis base compound, and titanium tetrachloride is described in Caunt, et al. U.S. Pat. No. 4,301,029 (Nov. 17, 1981). A similar catalyst component is described in Gavens, et al. U.S. Pat. No. 4,329,252 (May 11, 1982) in which the organomagnesium compound is a hydrocarbylmagnesium chloride (a Grignard reagent). These catalysts, however, are not high activity catalysts for the polymerization of propylene.

A class of olefin polymerization catalysts in which organomagnesium silylamide compounds are reacted with transition metal halides is described in Pullukat, et al. U.S. Pat. No. 4,499,198 (Feb. 12, 1985). One class of these compounds has the general structure

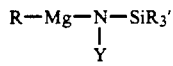

where R and R' are hydrocarbyl groups and Y is an alkyl, aryl or a tri-substituted silane group.

SUMMARY OF THE INVENTION

This invention relates to the use of magnesium silylamide compounds in the preparation of catalyst components for the polymerization of 1-olefins, especially propylene. These compounds are described by the structure

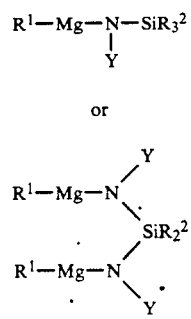

where $R^1$ and $R^2$ are the same or different alkyl groups and Y is an alkyl, aryl or silane group. $R^2$ also may be hydrogen. In the latter formula, all Y groups may be the same or different.

A solid catalyst component of the invention is prepared by contacting a silica-containing support material with the magnesium silylamide compound, a first electron donor stereoregulating agent, and a halogenated tetravalent titanium compound, followed by activation at an elevated temperature by contact of the resulting contact product with an excess of a halogenated tetravalent titanium compound in liquid form. The solid catalyst component is useful in a catalyst system including a complex of an alkyl aluminum cocatalyst compound and a second electron donor stereoregulating agent for the homopolymerization of propylene, or for the copolymerization of a major amount of propylene with one or more other 1-olefins. Polyolefins can be produced with high yield and stereoselectivity using this catalyst system.

There are several advantages to the use of the organomagnesium silylamide compounds of the invention rather than Grignard reagents or dialkylmagnesium compounds. The organomagnesium silylamides of the invention are highly soluble in common hydrocarbon solvents and do not require complexing solvents such as ether which may be undesirable in the preparation of the solid catalyst component. In addition, the reactivity of the alkyl-magnesium bond can be controlled by varying the substituents Y and $R^2$ in the silylamide portion of the molecule, as known from Pullukat, et al. U.S. Pat. No. 4,383,119 (May 10, 1983), the disclosure of which is incorporated herein by reference.

In particular, for example, the presence of a phenyl group pendant from the nitrogen strengthens the alkyl-magnesium bond, i.e., renders it less reducing.

Furthermore, the use of magnesium silylamide compounds in the preparation of olefin polymerization catalysts of the invention surprisingly improves both the activity of the catalyst and stereoregularity of the product polymer as compared to the use of catalysts made using Grignard reagents or diorganomagnesium compounds or complexes.

DETAILED DESCRIPTION OF THE INVENTION

The catalyst system of the invention includes, in combination, a solid titanium-containing component and a complex of an aluminum alkyl cocatalyst compound and a stereoregulating agent. The solid titanium-containing component is the reaction product of porous particulate silica-containing support material, a magnesium silylamide compound, an electron donor stereoregulating agent, and a halogenated tetravalent titanium compound.

The solid catalyst component is preferably prepared by first contacting, preferably in suspension in an inert liquid hydrocarbon medium, porous particles of a silica-containing support material with a magnesium silylamide compound of the formula

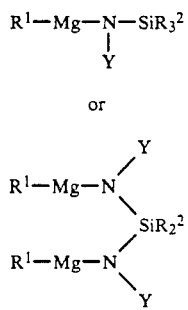

where $R^1$ is a straight chain or branched non-substituted alkyl group having 1 to 12 carbon atoms, $R^2$ is hydrogen or a straight chain or branched, substituted or nonsubstituted alkyl group of 1 to 12 carbon atoms, and Y is the same or different $SiR^2_3$ group, or an alkyl or aryl group. All $R^1$ groups are the same or different, all $R^2$ groups are the same or different, and all Y groups are the same or different. Compounds of formula

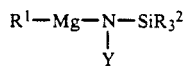

are preferred.

The support material is preferably predominately silica having surface hydroxyl and/or siloxane groups, and is used in the form of porous particles. If desired, the support material may be calcined at an elevated temperature (e.g. 600° C). In one embodiment, the invention utilizes a porous silica-containing support material which has been chemically treated in order to convert at least a portion of the surface hydroxyl groups into siloxane groups according to the reaction:

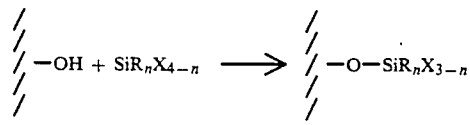

Solid catalyst components of the invention prepared from such surface-treated support materials give superior performance in terms of productivity and isotacticity in the polymerization of propylene compared to inventive catalysts prepared from non-surface treated silicacontaining support materials. A preferred silane is hexamethyldisilazane (HMDS).

Additionally, silica-containing support materials which have been pretreated with a silane may be further treated with a non-magnesium metal halide which is reactive with the hydroxyl groups of the support material surface. Although silicon compounds such as $SiCl_4$ are useful metal halides, non-silicon compounds such as $BCl_3$ and $AlCl_3$ are preferred. $BCl_3$ is highly preferred. The metal halide should be present at a molar ratio with respect to the surface hydroxyl groups of the support material such that substantially all available hydroxyl groups are reacted with the metal halide.

Treatment with the metal halide after silane pretreatment of the support material gives a great improvement in total performance of the catalyst system, i.e. in terms of productivity, isotacticity, and product morphology.

If desired, the hydroxyl groups of the support material may be reacted with the metal halide without silane treatment of the hydroxyl groups.

Useful support materials include silica, silica-alumina, and silica-containing tergels. Small amounts of zirconia, magnesia, or titania may be present as long as the support material is predominately (i.e., greater than 50 wt. %) silica.

The magnesium silylamide compounds and methods of preparing the same include those disclosed in Pullukat, et al. U.S. Pat. No. 4,383,119 (May 10, 1983). A preferred compound is butylmagnesium bistrimethylsilylamide (BMSA).

The magnesium silylamide compound is used in proportion to the support material such that the ratio of the magnesium compound to the support material is in the range of about 0.5 to about 10 mmol/g, and preferably in the range of about 1 to about 5 mmol/g.

The magnesium silylamide compound may be complexed to a first electron donor compound (which functions as a stereoregulating agent) prior to being contacted with the support material, or the first electron donor stereoregulating agent is contacted with the contact product of the support material and the magnesium silylamide compound in a subsequent step.

Alternatively, the support particles may be first contacted with the first electron donor stereoregulating agent, followed by contact with the magnesium silylamide compound.

The contact product of the support, magnesium silylamide compound, and the first electron donor stereoregulating agent is then reacted to completion with a halogenated tetravalent titanium compound, preferably a titanium halide such as titanium tetrachloride.

The titanium compound may be any catalytically active halogenated tetravalent compound such as a halide or partial ester. Titanium compounds of formula $Ti(OR)X_3$, or $Ti(OR)_2X$ where R is an alkyl (preferably isopropyl) or aryl group and X is a halide, preferably chloride, are suitable. The titanium compound should be used in a molar ratio with respect to the magnesium compound in the range of about 1:2 to about 1:4, with ratios at or near the upper end (i.e. about 1:2) of the range being preferred.

Additionally, it is preferred that the ratio of the titanium compound to the support material be within the range of about 0.5 to about 5 mmol/g.

The reaction between the titanium compound and the support-magnesium-electron donor contact product preferably takes place at ambient temperature (e.g. about 20–25° C.), but may be conducted at higher or lower temperatures, if desired.

The stereoregulating agent (i.e. the first electron donor compound) of the solid catalyst component may be any suitable electron donor compound which functions as a stereoregulating agent selected from the following groups: esters, ethers, amines, amides, ketones, phenols, phosphines, and phosphites. Preferred esters are those of carboxylic and silicic acids, and aromatic carboxylic acid esters are especially preferred.

Preferred specific esters include ethyl-, propyl-, and butylbenzoates.

The molar ratio of the first electron donor stereoregulating agent to the magnesium silylamide compound preferably should be in the range of about 0.5:1 to about 1.5:1, and the first electron donor stereoregulating agent is preferably used in substantially equimolar ratio with the magnesium compound.

The solid catalyst component must be activated by contact thereof with a molar excess (with respect to magnesium in the solid component) of a halogenated tetravalent titanium compound in liquid form at an elevated temperature (e.g. at least about 60° C.), preferably for several hours (e.g. about 2 to about 4 hours). Activation is preferably carried out at about 10 80–110° C., and in any event at a temperature less than the boiling point of the titanium compound at the pressure employed. (For example, at atmospheric pressure the boiling point of liquid TiCl4 is about 130° C.) Without such heat treatment, an unacceptable catalyst may result. Use of a great excess (e.g., 5 ml or more titanium compound per gram of starting support material) of the tetravalent titanium compound is preferred, as efficient heating is facilitated.

The halogenated tetravalent titanium compound used in the heat activation step may be a halide or alkoxy halide, and is preferably chlorinated. While TiCl4 is the preferred compound for use in the activation step, compounds of the formula $Ti(OR)X_3$, $Ti(OR)_2X_2$, and $Ti(OR)_3X$, where R is an alkyl (preferably isopropyl) or aryl group, and X is a halide, preferably chloride, are suitable.

The titanium compound must be in liquid form at heat activation conditions, and may be used neat, in solution, etc. If used neat, the titanium compound need not be liquid at ambient conditions.

The titanium compound used in the activation step is preferably, but not necessarily, the same as the titanium compound used in forming the solid catalyst component.

The temperature of the activation step is elevated with respect to the temperature at which the titanium compound is reacted with the support-magnesium-first electron donor contact product, the latter of which preferably is ambient temperature.

The activation step takes place only after the reaction between the titanium compound and the support-magnesium silylamide-first electron donor contact product is carried out to completion. Preferably, the product of this reaction (i.e., the solid catalyst component) is separated from the liquid reaction medium and washed prior to the activation step. It is important, however, that the activated solid component be separated from the activating liquid medium, washed to remove excess titanium compound, and preferably dried prior to contact with the alkyl aluminum-second electron donor complex for use in the polymerization reaction. Washing is preferably carried out with an inert hydrocarbon.

Preferably, titanium tetrachloride is the titanium compound used both in forming the solid catalyst component and in activation thereof.

The solid titanium-containing catalyst component is used in combination with a complex of an alkyl aluminum cocatalyst compound and a second electron donor stereoregulating agent in the homopolymerization of propylene, or copolymerization of a major amount of propylene with one or more other 1-olefins.

The alkyl aluminum compound may be chosen from a wide range of compounds. Particularly suitable are trialkyl aluminum compounds having up to 20 carbon atoms per alkyl chain or products of the reaction of such compounds with amines, and those containing two or more aluminum atoms bound to one another by an oxygen atom.

Typical examples of such compounds are: triethylaluminum, trimethylaluminum, tri-n-butylaluminum, triisobutylaluminum, tri-n-hexylaluminum, triisooctylaluminum,

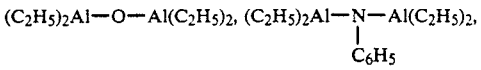

isoprenylaluminum, and the like.

The ratio of the alkyl aluminum cocatalyst compound to the solid catalyst component may vary over a wide range (e.g. Al:Ti atomic ratio of about 10:1 to about 200:1) with operable ratios being readily empirically determinable by those skilled in the art. An atomic ratio of aluminum to titanium in the range of about 40:1 to about 80:1 is preferred.

The second stereoregulating agent (i.e. the second electron donor compound) used in conjunction with the alkyl aluminum cocatalyst compound may be the same as or different from the first electron donor compound of the solid catalyst component. The second stereoregulating agent may be an ester, ether, amine, amide, ketone, phenol, phosphine, or phosphite. Particularly suitable are the esters of carboxylic acids (i.e. an aromatic carboxylic acid ester such as methyl-p-toluate) and esters of silicic acids. Examples of these compounds are those identified as useful as the stereoregulating agent of the solid catalyst component as well as dimethyldimethoxysilane, diphenyldimethoxysilane, vinyltrimethoxysilane, methyltrimethoxysilane, phenyltrimethoxysilane, ethyltriethoxysilane, phenyltriethoxysilane, and the like.

The second electron donor stereoregulating agent should be used at less than an equimolar ratio with respect to the aluminum cocatalyst compound, with a minimum molar ratio of about 0.01:1.

It is important that the alkyl aluminum cocatalyst compound and the second electron donor stereoregulating agent be contacted with one another to form a complex with each other prior to contact with the solid catalyst component.

Care should be taken to ensure that contact time between the alkyl aluminum cocatalyst compound and the second electron donor stereoregulating agent be limited in order to prevent the formation of alkyl aluminum alkoxide compounds, which detrimentally affect the performance of the catalyst system.

In one embodiment of the invention, the various catalyst-forming contact and reaction steps are carried out in suspension in an inert liquid hydrocarbon medium such as a liquid alkane, e.g. n-heptane. The solid catalyst component may be separated from the suspension by any suitable means, such as by filtering, for example, subjected to one or more washing steps to remove excess reactants, dried, activated, and then combined with the alkyl aluminum cocatalyst compound and the second electron donor stereoregulating agent (or complex of the alkyl aluminum compound and the second electron donor stereoregulating agent) for the polymerization process.

The catalyst system of the invention may be used successfully in a variety of polymerization processes, including gas phase processes, liquid phase processes bulk processes, and slurry processes, and combinations of two or more of such processes. The catalyst system may also be used to copolymerize a major amount of propylene and (i.e. 50 mole % or more of the copolymer product) of one or more other 1-olefins, such as ethylene, in a variety of processes, such as a onestage process or a two-stage process, for example, to prepare so-called random or impact polypropylenes. Suitable reaction conditions are well known to those skilled in the art of propylene polymerization.

EXAMPLES

The invention will be illustrated in the following examples, which set forth a procedure for preparing a solid catalyst component.

The support material used in the following examples was Davison Chemical grade 953 silica which had been contacted with an amount of hexamethyldisilazane (HMDS) equal to 10 weight percent of the silica for 30 days at ambient temperature. The product was then dried in a nitrogen fluidized bed at 120° C for four hours. The quantity of HMDS used was equal to 0.63 mmol per gram of $SiO_2$.

Each catalyst component was tested in propylene polymerization according to the following procedure.

A 1-liter stainless steel autoclave which was dried at 120° C was charged with 1.0 ml of a 1.03 M solution of triisobutylaluminum (TIBAL) in n-heptane and an indicated amount of a solution of methyl-p-toluate (MPT) in n-heptane. Then, hydrogen (12.3 mmol) was introduced into the autoclave, followed by 600 ml of liquified propylene. The solid catalyst component (50 mg except in Example 3A where 30 mg was used with 0.60 mmol TIBAL and 0.10 mmol MPT) was then added and the polymerization was allowed to proceed for one hour at 70° C. The results are listed in the Table, below, following the examples describing the preparation of the solid catalyst components. In these examples, the term percent heptane insolubles (abbreviated %HI) denotes the fraction of the polymer which is insoluble in boiling heptane after two hours of contact therein and is indicative of the degree of isotacticity of the polymer produced.

EXAMPLE 1

To a dry, nitrogen purged reaction flask was added 3.9 grams of the HMDS-treated Davison 953 $SiO_2$ described above. Throughout the preparation, a continuous flow of dry nitrogen was maintained. A 30 ml volume of dry n-heptane was then added, followed by 15.7 ml of an n-heptane solution containing 9.75 mmol (2.5 mmol/g silica) of butylmagnesium bis-trimethylsilylamide (BMSA). The mixture was stirred at room temperature (about 20–25° C.) for 30 minutes. Then, 1.6 ml of propyl benzoate were added, followed by another 30 minutes of stirring at room temperature. Titanium tetrachloride (4.9 mmol in 8 ml n-heptane, 1.25 mmol/g silica) was added slowly to this mixture at room temperature. During this step, the suspension began to gel, and then broke up into finely divided particles. After stirring at room temperature for one hour, the suspension was filtered through a glass frit fitted onto the bottom of the flask. The solids were resuspended in 50 ml of dry n-heptane. This procedure was repeated four times. After the washings were complete, the solids were dried at 60° C under a flow of dry nitrogen.

The dried solids were resuspended in 30 ml of neat titanium tetrachloride and heated to 80° C for two hours. The solids were then filtered while hot, resuspended in 50 ml of dry n-heptane and filtered again. The n-heptane washing procedure was repeated four more times. The solids were then dried at 60° C. under a flow of dry nitrogen to give a free-flowing yellow-orange powder containing 2.6 wt % Ti and 3.8 wt % Mg.

EXAMPLE 2

The catalyst component of Example 1 was again suspended in 30 ml of neat titanium tetrachloride and heated to 80° C for two hours. The solids were filtered while hot, resuspended in 50 ml of n-heptane and filtered again. The n-heptane washing procedure was repeated four more times and the solids dried at 60° C. under a flow of nitrogen. The resulting catalyst component was a yellow-orange free-flowing powder containing 2.9 wt % Ti and 3.4 wt % Mg.

EXAMPLE 3 AND 3A

A catalyst component was made according to Example 1 except that the final heat treatment with titanium tetrachloride was carried out at 115° C. The resulting solid component was an orange free-flowing powder containing 3.5 wt % Ti and 3.9 wt % Mg.

EXAMPLE 4

A catalyst component was made according to Example 1 except that ethyl benzoate was substituted for propyl benzoate. The resulting solid component was a yellow-orange free-flowing powder containing 3.1 wt % Ti and 3.8 wt % Mg.

EXAMPLE 5

A catalyst component was made according to Example 1 except that butyl benzoate was substituted for propyl benzoate. The resulting solid component was a pale yellow free-flowing powder containing 2.4 wt % Ti and 2.5 wt % Mg.

EXAMPLE 6

A catalyst component was made according to Example 1 except that butylmagnesium bistrimethylsilylamide (BMSA) and propyl benzoate (1:1 mole ratio) were premixed for 10 minutes and the resulting mixture was added to the HMDS-treated Davison 953 $SiO_2$ The resulting solid component was a yellow-orange free-flowing powder containing 3.0 wt % Ti and 3.7 wt % Mg.

EXAMPLE 7

A catalyst component was made according to Example 6 except that butyl benzoate was substituted for propyl benzoate. The resulting solid component was a yellow-orange free-flowing powder containing 2.9 wt % Ti and 3.5 wt % Mg.

COMPARATIVE EXAMPLE 1

A catalyst component was made according to Example 1 except that butylethylmagnesium (BEM) was used in place of butylmagnesium bis-trimethylsilylamide (BMSA). The resulting solid component was a brown free-flowing powder containing 3.6 wt % Ti and 3.8 wt % Mg.

This example illustrates the detrimental effect of substituting a diorganomagnesium compound for the magnesium silylamide compound of the invention.

COMPARATIVE EXAMPLE 2

A catalyst component was made according to Example 1 except that a Grignard reagent (butylmagnesium chloride, 2.0 M solution in diethylether), was used in place of butylmagnesium bis-trimethylsilylamide (BMSA). The resulting solid component was a pale yellow free-flowing powder containing 2.4 wt % Ti and 3.0 wt % Mg.

This examples demonstrates the detrimental effect of substituting a Grignard reagent for the magnesium silylamide compound of the invention.

COMPARATIVE EXAMPLE 3

A catalyst component was made according to Example 1 except for the following changes: 1) no propyl benzoate was used, 2) the solids were washed by decantation of the supernatant liquid instead of filtration and 3) the solids were not dried after the first washing procedure. The resulting solid component was a dark brown free-flowing powder containing 5.0 wt % Ti and 2.4 wt % Mg.

This example illustrates the effect of eliminating the first electron donor stereoregulating agent from an inventive catalyst.

EXAMPLE 8

A catalyst component was made according to Example 1 except that the silica was not treated with hexamethyldisilazane, but rather was calcined at 600° C. The resulting solid component was a yellow-orange free-flowing powder containing 3.7 wt % Ti and 3.7 wt % Mg.

EXAMPLE 9

A catalyst component was made according to Example 1 except that the HMDS-treated Davison 953 silica was further treated in the following way: to a suspension of the HMDS-treated silica in n-heptane was added a solution of boron trichloride in hexane so that the amount of boron trichloride was equal to 1.0 mmol per gram of $SiO_2$. The suspension was stirred at room temperature for 14 hours at which time the mixture was allowed to evaporate to dryness. The resulting solids were used as the inorganic oxide support material in the catalyst preparation. The catalyst prepared in this manner was a yellow-orange free-flowing powder containing 1.7 wt % Ti and 3.5 wt % Mg.

EXAMPLE 10

A catalyst component was made according to Example 3 except that the silica used was the boron trichloride treated SiO2 described in Example 9. The resulting catalyst component was a light orange free-flowing powder containing 1.6 wt % Ti and 4.0 wt % Mg.

EXAMPLE 11

A catalyst component was made according to Example 1 except that an equivalent amount of butylmagnesium trimethylsilylaniline was used in place of butylmagnesium bis-trimethylsilylamide (BMSA). The butylmagnesium trimethylsilylaniline was prepared by contacting a solution of butylethylmagnesium in n-heptane with N-trimethylsilylaniline. The resulting solid catalyst component was a yellow-orange free-flowing powder containing 2.9 wt.% Ti and 3.7 wt.% Mg.

COMPARATIVE EXAMPLE 4

In a procedure similar to that of Example 1, 4.1 grams of HMDS-treated Davison 953 SiO2 were contacted with 10.3 mmol of BMSA in 30 ml of dry n-heptane at room temperature for 30 minutes. Then 1.7 ml of propyl benzoate were added and reacted for another 30 minutes. At this point, the mixture was filtered, the residue resuspended in 30 ml of titanium tetrachloride and heated to 80° C for two hours. The solids were then filtered while hot, resuspended in 50 ml of n-heptane and filtered again. The n-heptane washing procedure was repeated four times. The solids were then dried at 60° C. under a flow of dry nitrogen to give a bright yellow free-flowing powder containing 2.8 wt % Ti and 1.4 wt % Mg.

COMPARATIVE EXAMPLE 5

A catalyst component was prepared as in Comparative Example 4 except that the mixture was evaporated to dryness at 60° C under a flow of nitrogen instead of filtration after treatment with propyl benzoate. The resulting solid component was a brown free-flowing powder containing 6.4 wt % Ti and 3.9 wt % Mg.

Comparative Examples 4 and 5 illustrate the necessity of treatment with a stoichiometric excess of a halogenated tetrachloride titanium compound in the preparation of inventive catalysts.

COMPARATIVE EXAMPLE 6

To a dry, nitrogen purged round bottom flask was added 2.3 grams of HMDS-treated Davison 953 $SiO_2$ The silica was slurried in 30 ml of dry n-heptane and 9.3 ml of an n-heptane solution containing 5.8 mmol of BMSA were added. The mixture was stirred for 30 minutes at room temperature then 2.9 mmol of titanium tetrachloride in 10 ml n-heptane were added. The mixture was stirred an additional 30 minutes at room temperature and then evaporated to dryness by heating the flask to 60° C. under a flow of dry nitrogen. The resulting solid component was a black free-flowing powder containing 3.3 wt % Ti and 4.0 wt % Mg.

Comparative Example 6 demonstrates a catalyst made according to the procedure of Pullukat, et al. U.S. U.S. Pat. No. 4,544,646 (Oct. 1,1985), the disclosure of which is hereby incorporated herein by reference. Neither an electron donor stereoregulating agent nor an activation step of the invention was used.

TABLE

POLYMERIZATION RESULTS

| Solid Component | mmol TIBAL | mmol MPT | Yield PP | gPP/g Cat | gPP/g Ti | % HI |
|---|---|---|---|---|---|---|
| Example 1 | 1.03 | 0.16 | 76.0 gm | 1520 | 62,500 | 90.6 |
| Example 2 | 1.03 | 0.18 | 83.0 gm | 1660 | 58,800 | 92.9 |
| Example 3 | 1.03 | 0.16 | 118.0 gm | 2360 | 76,900 | 87.4 |
| Example 3A* | 0.60 | 0.10 | 60.0 gm | 1965 | 58,800 | 91.8 |
| Example 4 | 1.03 | 0.16 | 68.0 gm | 1360 | 50,000 | 86.5 |
| Example 5 | 1.03 | 0.18 | 76.5 gm | 1530 | 76,900 | 88.6 |
| Example 6 | 1.03 | 0.14 | 83.0 gm | 1660 | 58,800 | 90.7 |
| Example 7 | 1.03 | 0.16 | 78.5 gm | 1570 | 55,600 | 86.5 |
| Comparative Example 1 | 1.03 | 0.16 | 48.8 gm | 980 | 29,400 | 72.8 |
| Comparative Example 2 | 1.03 | 0.16 | 31.7 gm | 634 | 28,600 | 82.0 |
| Comparative Example 3 | 1.03 | 0.24 | 25.8 gm | 520 | 12,800 | 59.6 |
| Example 8 | 1.03 | 0.24 | 47.5 gm | 950 | 27,000 | 88.4 |
| Example 9 | 1.03 | 0.16 | 124.5 gm | 2490 | 143,000 | 91.1 |
| Example 10 | 1.03 | 0.16 | 137.1 gm | 2742 | 166,700 | 91.3 |
| Example 11 | 1.03 | 0.16 | 49.0 gm | 980 | 45,500 | 80.9 |
| Comparative Example 4 | 1.03 | 0.16 | 15.5 gm | 310 | 12,500 | 71.6 |
| Comparative Example 5 | 1.03 | 0.16 | 11.5 gm | 230 | 3,600 | 79.8 |
| Comparative Example 6 | 1.03 | 0.16 | 0 gm | 0 | 0 | N/A |

*30 mg catalyst, 0.60 mmol TIBAL and 0.10 mmol MPT

From the foregoing description, those skilled in the art will appreciate that the invention provides relatively high productivity catalyst systems which can be simply and economically prepared and which are capable of producing polymer products characterized by high isotacticity and excellent morphology. The morphology characteristics of the invention make possible improved reaction control (i.e. heat transfer, product bulk density, etc.).

The positive effect on productivity of the use of magnesium silylamide compound-containing catalysts as compared to those containing diorganomagnesium compounds or Grignard reagents in propylene polymerization is surprising, especially in view of the high isotacticity of the polypropylene products of the invention. Furthermore, polymer properties such as molecular weight, molecular weight distribution, and comonomer incorporation can be at least partially controlled by selection of the silylamide functionality of the magnesium compound.

The foregoing detailed description is given for clearness of understanding only, and no unnecessary limitations are to be understood therefrom, as modifications within the scope of the invention will be apparent to those skilled in the art.

We claim:

1. A method of making propylene polymers comprising the step of homopolymerizing propylene or copolymerizing a major amount of propylene with one or more other 1-olefins under polymerization conditions in the presence of a catalyst system comprising, in combination:

I. a solid catalyst component prepared by the method comprising the steps of:
   (a) contacting porous particles of a predominately silica support material having surface hydroxyl groups, surface siloxane groups, or both with a magnesium silylamide compound and thereafter contacting the resulting product with a first electron donor stereoregulating agent; or
   (b) contacting porous support material particles as defined in step (a) with a complex prepared by contacting a magnesium silylamide compound with a first electron donor stereoregulating agent; or,
   (c) contacting porous support material particles as defined in step (a) with a first electron donor stereoregulating agent followed by a magnesium silylamide compound;

said magnesium silylamide compound being of a formula selected from the group consisting of

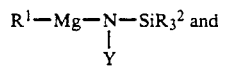

and

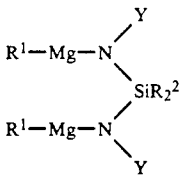

wherein $R^1$ is a straight or branched chain non-substituted alkyl group having 1 to 12 carbon atoms, $R^2$ is hydrogen or a straight or branched chain alkyl group having 1 to 12 carbon atoms, and Y is an alkyl group, an aryl group, or $-SiR^3_3$, wherein $R^3$ is hydrogen or a straight or branched chain alkyl group having 1 to 12 carbon atoms, all $R^1$ groups are the same or different, all $R^2$ groups are the same or different, all $R^3$ groups are the same or different, all Y groups are the same or different, and each of said $R^2$ and $R^3$ alkyl groups is non-substituted or substituted with one or more inert substituents that are non-reactive to the Mg-N bond or bonds of said magnesium silylamide compound; (2) reacting to completion the contact product of step (1) with a first halogenated tetravalent titanium compound, the atomic ratio of titanium to magnesium in said solid catalyst component being in the range of about 1:2 to about 1:4;

(3) activating the reaction product of step (2) by contact thereof with a molar excess with respect to magnesium in said solid catalyst component of a second halogenated tetravalent titanium compound which may be the same as or different from said first titanium compound in liquid form at an elevated temperature with respect to step (2) to provide an active solid catalyst component; and, (4) separating and washing said active solid catalyst component; and II. a complex of an alkyl aluminum cocatalyst compound and a second electron donor stereoregulating agent which may be the same as or different from said first electron donor stereoregulating agent, the molar ratio of said second electron donor stereoregulating agent to the aluminum of said cocatalyst compound being in the range of about 0.01:1 to less than about 1:1.

2. The method of claim 1 wherein said magnesium silylamide compound is

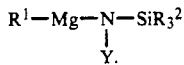

3. The method of claim 1 wherein said contacting or reaction steps are carried out in suspension in an inert liquid hydrocarbon medium.

4. The method of claim 1 wherein the ratio of said magnesium silylamide compound to said support material is in the range of about 0.5 to about 10 mmol/g.

5. The method of claim 4 wherein said magnesium silylamide/support material ratio is in the range of about 1 to about 5 mmol/g.

6. The method of claim 5 wherein the ratio of said first titanium compound to said support material is in the range of about 0.5 to about 5 mmol/g.

7. The method of claim 1 wherein the molar ratio of said first electron donor stereoregulating agent to said magnesium silylamide compound is in the range of about 0.5:1 to about 1.5:1.

8. The method of claim 7 wherein the molar ratio of said first electron donor stereoregulating agent to said magnesium silylamide compound is about 1:1.

9. The method of claim 1 wherein the ratio of said magnesium silylamide compound to said support material is in the range of about 0.5 to about 10 mmol/g, the ratio of said first titanium compound to said support material is in the range of about 0.5 to about 5 mmol/g, and the molar ratio of said first electron donor stereoregulating agent to said magnesium silylamide compound is in the range of about 0.5:1 to about 1.5:1.

10. The method of claim 1 wherein said support material has surface siloxane groups and is prepared by pretreating support material having surface hydroxyl groups by contact thereof with a silane reactive with said hydroxyl groups prior to said step (1).

11. The method of claim 10 wherein said silane is hexamethyldisilazane.

12. The method of claim 10, wherein said pretreated support material is further treated by contact thereof with a non-magnesium metal halide which is reactive with said support material surface prior to said step (1), said metal halide being present in said solid component in an amount sufficient to react with substantially all available surface hydroxyl groups remaining after contact of said support material with said silane.

13. The method of claim 12 wherein said metal halide is selected from the group consisting of $BCl_3$ and $AlCl_3$.

14. The method of claim 1 wherein said support material has surface hydroxyl groups prior to said step (1).

15. The method of claim 14 wherein said support material is calcined prior to contact with said magnesium silylamide compound or complex.

16. The method of claim 1 wherein said magnesium silylamide compound is butylmagnesium bistrimethylsilylamide.

17. The method of claim 1 wherein said first titanium compound is a titanium halide.

18. The method of claim 17 wherein said first titanium compound is $TiCl_4$.

19. The method of claim 1 wherein said first electron donor stereoregulating agent is selected from the group consisting of esters, ethers, amines, amides, ketones, phenols, phosphines, and phosphites.

20. The method of claim 19 wherein said first electron donor stereoregulating agent is an ester selected from esters of carboxylic and silicic acids.

21. The method of claim 20 wherein said first electron donor stereoregulating agent is an ester of an aromatic carboxylic acid selected from the group consisting of ethyl-, propyl-, and butylbenzoates.

22. The method of claim 1 wherein said second electron donor stereoregulating agent is selected from the group consisting of esters, ethers, amines, amides, ketones, phenols, phosphines, and phosphites.

23. The method of claim 22 wherein said second electron donor stereoregulating agent is an ester selected from the group consisting of carboxylic acid esters and esters of silicic acid.

24. The method of claim 23 wherein said second electron donor stereoregulating agent is an ester of an aromatic carboxylic acid.

25. The method of claim 24 wherein said second electron donor stereoregulating agent is methyl-p-toluate.

26. The method of claim 23 wherein said second electron donor stereoregulating agent is a silicic acid ester selected from the group consisting of dimethyldimethoxysilane, diphenyldimethoxysilane, vinyltrimethoxysilane, methyltrimethoxysilane, phenyltrimethoxysilane, ethyltriethoxysilane, and phenyltriethoxysilane.

27. The method of claim 1 wherein said steps (1) and (2) are carried out in suspension in an inert liquid hydrocarbon medium, said solid catalyst component is separated therefrom, washed, dried, and subsequently contacted with a molar excess with respect to magnesium in said solid catalyst component of said second halogenated titanium compound of step (3) in liquid form at an elevated temperature with respect to step (2), separated, washed, and then dried prior to being combined with said complex of II.

28. The method of claim 1 wherein the atomic ratio of aluminum in said cocatalyst compound to titanium in said solid catalyst component is in the range of about 10:1 to about 200:1.

29. The method of claim 28 wherein said Al:Ti atomic ratio is in the range of about 40:1 to about 80:1.

30. The method of claim 1 wherein said cocatalyst compound is selected from the group consisting of trialkyl aluminum compounds having alkyl groups of up to 20 carbon atoms, products of reaction of said trialkyl aluminum compounds with amines, and alkylaluminum compounds containing two or more aluminum atoms bonded to each other through an oxygen atom.

31. The method of claim 30 wherein said cocatalyst compound is selected from the group consisting of triethylaluminum, trimethylaluminum, tri-n-butyaluminum, triisobutylaluminum, tri-n-hexylaluminum, triisooctylaluminum, isoprenylaluminum,

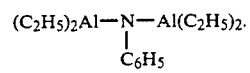

32. The method of claim 1 wherein said inert substituents are selected from the group consisting of ether groups, tertiary amine groups, chloride groups, fluoride groups, and combinations thereof.

* * * * *

UNITED STATES PATENT AND TRADEMARK OFFICE
CERTIFICATE OF CORRECTION

PATENT NO. : 5,036,147
DATED : July 30, 1991
INVENTOR(S) : C.C. Meverden et al

It is certified that error appears in the above-indentified patent and that said Letters Patent is hereby corrected as shown below:

Column 3, line 39: between "different." and "Compounds" insert -- The R groups are preferably unsubstituted but may have inert substituents that are nonreactive to the highly reactive Mg-N bonds, preferred substituents being ether groups, tertiary amine groups, chloride and fluoride groups and combinations thereof.--.

Column 11, line 61: before "(a)" insert -- (1) --.

Column 12, line 65:

read "silylamide compound; (2) reacting to comple-" should

-- silylamide compound;
(2) contacting the contact

Column 13, line 63: after "10" delete the comma.

Column 14, line 16: "TiC14" should read -- TiCl$_4$ --.

Column 15, line 10: after "isoprenylaluminum," insert -- $(C_2H_5)_2Al-O-Al(C_2H_5)_2$, and --.

Signed and Sealed this

Fourteenth Day of September, 1993

Attest:

BRUCE LEHMAN

*Attesting Officer*    *Commissioner of Patents and Trademarks*